(12) United States Patent
Hook, Jr. et al.

(10) Patent No.: US 10,742,649 B1
(45) Date of Patent: Aug. 11, 2020

(54) SECURE AUTHENTICATION AND VIRTUAL ENVIRONMENT SETUP

(71) Applicant: Sykes Enterprises, Incorporated, Tampa, FL (US)

(72) Inventors: J. Shelton Hook, Jr., Tampa, FL (US); David Pearson, Tampa, FL (US); Richard Sadowski, Tampa, FL (US); Stephen Berdy, Tampa, FL (US); Michael Ritterbusch, Tampa, FL (US)

(73) Assignee: Sykes Enterprises, Incorporated, Tampa, FL (US)

( * ) Notice: Subject to any disclaimer, the term of this patent is extended or adjusted under 35 U.S.C. 154(b) by 364 days.

(21) Appl. No.: 15/852,732

(22) Filed: Dec. 22, 2017

Related U.S. Application Data (63) Continuation-in-part of application No. 15/402,210, filed on Jan. 9, 2017.

(60) Provisional application No. 62/276,179, filed on Jan. 7, 2016.

(51) Int. Cl.
| | |
|---|---|
| *G06F 15/177* | (2006.01) |
| *H04L 29/06* | (2006.01) |
| *G06F 21/62* | (2013.01) |
| *G06F 9/451* | (2018.01) |
| *G06Q 30/00* | (2012.01) |

(52) U.S. Cl.
CPC ...... *H04L 63/0876* (2013.01); *G06F 21/6218* (2013.01); *H04L 63/0272* (2013.01); *H04L 63/083* (2013.01); *H04L 63/102* (2013.01); *G06F 9/452* (2018.02); *G06Q 30/016* (2013.01); *H04L 63/101* (2013.01)

(58) Field of Classification Search
CPC ............ H04L 63/0876; H04L 63/0272; G06F 21/6218
USPC .................................................. 709/203, 220
See application file for complete search history.

(56) References Cited

U.S. PATENT DOCUMENTS

| | | | |
|---|---|---|---|
| 9,961,519 B1 * | 5/2018 | Ashe ..................... | H04W 4/12 |
| 2006/0203815 A1 * | 9/2006 | Couillard ............ | H04L 12/4641 370/389 |
| 2015/0319174 A1 * | 11/2015 | Hayton ................ | H04L 63/205 726/7 |
| 2017/0171199 A1 * | 6/2017 | Bao ..................... | H04L 63/0838 |

* cited by examiner

*Primary Examiner* — Duyen M Doan
(74) *Attorney, Agent, or Firm* — Shumaker, Loop & Kendrick, LLP; Jeffrey B. Fabian (57) ABSTRACT

Disclosed are systems and methods that enable secure authentication to a network and virtual environment setup. An end point computing device combines data input by a user with stored data to determine an IP address where login credentials can be transmitted for authentication. The end point device transmits system information to a provider front end computing device for authentication. In this manner, a user identity and the end point device can be authenticated without the need to store identifying information to the end point device or communicate with a provider's secure back end network. The provider devices determine permissions data that define the user's ability to interact with the provider's network. The provider front end device transmits settings data to the end point device that is used to connect to the provider's network and establish a virtual working environment.

14 Claims, 6 Drawing Sheets

SECURE AUTHENTICATION AND VIRTUAL ENVIRONMENT SETUP

CROSS REFERENCE TO RELATED APPLICATION

This application claims priority from copending U.S. nonprovisional application Ser. No. 15/402,210 Jan. 9, 2017, the entirety of which is incorporated herein by reference.

TECHNICAL FIELD AND BACKGROUND

The present invention relates generally to the field of secure authentication to a computer network and virtual environment setup.

Security in computer networks continues to be a paramount concern as more and more individuals utilize access remote applications, databases, and other network resources. In addition, individuals require access to an increasing variety of networks and network resources. For instance, an employee working from home may establish a remote connection to an employer's network and utilize a variety of systems and software applications in performing his or her job functions. Often such remote access occurs over unsecured networks using unsecured devices and presents a significant security risk.

As cybersecurity techniques have become more sophisticated, gaining access to network resources has become onerous from a user standpoint. Existing authentication systems can require a complex sequence of steps to authenticate the user's identity or may require multiple sets of login credentials. It would, therefore, be advantageous to provide for streamlined authentication into a network as well as streamlined access to various software applications and resources available on the network while still allowing for a high-degree of security. Accordingly, it is an object of the present invention to implement systems and methods that permit secure, convenient access to a network and customizable virtual environments for use of various network resources using a single set of login credentials.

SUMMARY

According to one embodiment, systems and methods are provided for authenticating a user and the user's end point device to a provider's network and for establishing a virtual environment for the user to access the provider's network resources. The virtual environment can be, for example, a virtual desktop environment or a virtual telephone interface. The type of virtual environment and the user's ability to access resources and applications in the environment can be defined as a set of user permissions defined for each user.

An end point device operated by an agent or other user determines an IP address by retrieving data input by the user and combining the input data with stored EPCFG data and translating the combined data into an IP address. The input data can be, for example, domain data associated with a User Principal Name ("UPN") or an email address.

A local web proxy on the end device restricts Internet web access. When the end device is first booted, the web proxy is enabled and no access is allowed to any Universal Resource Locator ("URL"). The Login GUI code progressively adds whitelist entries to allow access to specific URLs on demand, when needed.

The agent computing device uses the IP address to transmit login credentials (i.e., a username and password) to a directory service application that authenticates the credentials. The directory service application may be running on a cloud server and can communicate, as necessary, with a secure provider network to verify the login credentials.

The agent computing device also gathers system configuration data, such as encrypted system files or a hardware identifier and transmits the system configuration data to a provider device for authentication. A front end provider device may receive the system configuration data and communicate with a back end device during authentication. This has the advantage of eliminating direct communication between a secure back end network and an unauthenticated agent computing device.

Upon successful authentication, a provider device can obtain a set of permissions that are predefined for a given user. The permissions define various parameters or boundaries of the user's ability to access the provider's network resources. For instance, the user may be authorized only to access certain provider systems, applications, databases, etc., and the virtual environment provided to the user can be customized according to these permissions.

The provider device transmits the permissions data to the agent computing device for display. The user may have a variety of options to select a set of permissions. The user selects a set of permissions, and the selection is transmitted to the provider device. Depending on the permissions data selection, the provider device determines the virtual environment data that is transmitted to the agent computing device. The virtual environment data can be, for instance, a virtual desktop image or a virtual telephone image that is displayed by the agent computing device.

For added security, the agent computing device can be configured as a thin client device that does not contain any reference to the provider and that limits a user's ability to write data to the system.

In one embodiment, the directory service application runs on a cloud server. The agent computing device can obtain address information for the cloud server by first transmitting a message to a beacon computing device using the IP address determined from the combined input and EPCFG data. The beacon computing device returns operations configuration data that includes a failover flag indicating when a provider network outage has occurred as well as address information for the cloud server.

In an additional aspects of the invention, the provider front end device can perform a buoy check that determines if the agent computing device is operating from a remote location or operating on the provider's secure back end network. The provider computing device determines connection settings, such as a virtual private network ("VPN") universal resource locator ("URL") and an operations application programming interface ("API") URL that depend on the results of the buoy check and the selected permissions. The provider computing device may also perform a schedule based access check to verify whether the user selected permissions are authorized at a particular time for that user. Thus, not only can certain permissions be defined for each user, but the permission may also depend on the day and time.

The connection settings are transmitted to the agent computing device for use in establishing a VPN connection to the provider network. The provider network can additionally provide virtual environment settings to the agent computing device that are used by the agent computing device to initiate a virtual environment.

The system can further be configured with a failover service that permits authentication and virtual environment setup even in the event of a provider network outage. During a successful login, the system stores failover data to a publicly accessible source, such as the cloud server. The failover data can include "last known good configuration data," such as copies of the last three key system files or other information used during device authentication. The failover data can also include the last used permissions data and accompanying settings (i.e., VPN URL, virtual desktop or virtual telephone settings, etc.).

In the event of a network outage, the agent computing device is notified of the outage via receipt of a failover indicator transmitted, for instance, as part of the operations configuration information received from the beacon computing device. The agent computing device then transmits the login credentials and system configuration data to a failover service. The failover service retrieves the failover data and authenticates the login credentials and system configuration data received from the agent computing device. The failover service can then transmit connection settings or virtual environment settings data to the agent computing device for use in establishing a VPN connection and a virtual environment.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

As used herein, the term provider generally describes the person or entity providing customer support and service. The term "customer support" is used interchangeably with the terms support or customer service and generally includes, but is not limited to, providing customers with assistance in utilizing existing products and services and with purchasing additional products and services. The term client is used to generally denote customers of the service provider who establish a relationship with the provider to render customer support on behalf of the client; in other words, the provider is operating as a third-party provider of customer support services for the client. The term agent generally describes an individual who interfaces with the customer to provide customer support using the systems and methods described herein, and the term is used interchangeably with the terms user, associate, or representative.

Figure 1:
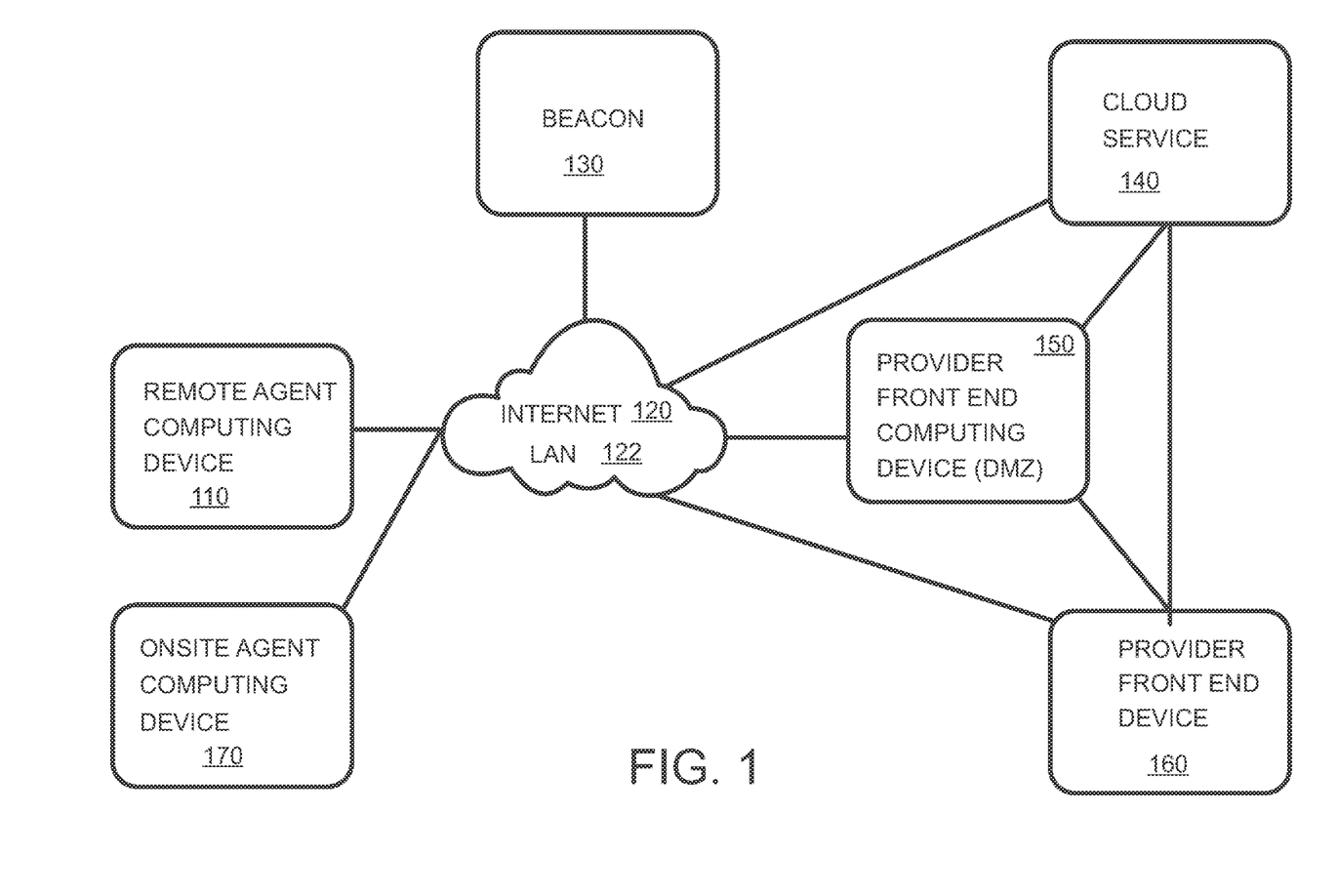
FIG. 1 is an exemplary system diagram according to one embodiment.

As shown in FIG. 1, a provider system configuration according to one embodiment includes a remote agent computing device 110, a beacon computing device 130, a cloud service computing device 140, a provider front end computing device 150, a provider back end computing device 160, and an onsite agent computing device 170. The embodiment shown in FIG. 1 is not intended to be limiting, and one of ordinary skill in the art will recognize that the system may be implemented using other suitable hardware or software configurations. For instance, the system could be implemented using onsite agent computing devices 170 with no remote agent computing devices 110, or no onsite agent computing devices 170 but one or more remote agent computing devices 110. As another non-limiting example, the system may utilize only a single computing device to implement one or more of the beacon computing device 130, the cloud service computing device 140, or the provider front end computing device 150.

The computing devices can be, but are not limited to, a tablet computer, laptop, or desktop computer. In a preferred embodiment, the remote agent computing device 110 is implemented as a thin client computing device or terminal that is preconfigured with software dedicated to a specified purpose and generally not configurable by a user and that does not permit users to write data to storage. The storage is optionally implemented as a solid state drive rather than a traditional hard disk drive, which provides the advantages of reliability and longevity of use. The thin client is configured so that there is no reference to the provider either physically on the device or saved to the device storage so as to militate against the risk that the thin client device could be used for unauthorized access to the provider network. The computing devices include various input/output devices and ports, such as a screen that may have a tactile interface, a keyboard, mouse, and audio input/output ports, among other features.

The computing devices may include a processor that communicates with a number of peripheral subsystems via a bus subsystem. These peripheral subsystems may include a storage subsystem, user-interface input devices, user-interface output devices, a communication system, a network interface subsystem, or a geolocation positioning system. By processing instructions stored on one or more storage devices, the processor may perform the steps of the present methods and implement the present systems. Various types of storage device may be used, including an optical storage device, a magnetic storage device, or a solid-state storage device.

Typically, the remote agent computing devices 110 access the provider front end computing devices 150 and cloud service computing device 140 over the Internet 120 in the normal manner. The provider front end computing device 150 can be referred to as a "demilitarized zone" ("DMZ") and represents a physical or logical sub-network that separates the provider internal network from untrusted networks, such as the Internet 120. External-facing servers, resources, and services are located in the DMZ so they are accessible from the Internet 120 but the rest of the internal LAN 122 remains unreachable. The DMZ provides security by restricting direct access to a provider internal network prior to authentication of a remote computing device or user. The onsite computing devices may access the provider computing devices through one or more local connections, such as a LAN or WWAN based on 802.11 standards. These connections are merely representative of a multitude of connections that can be made for accessing the provider computing devices.

Figure 2:
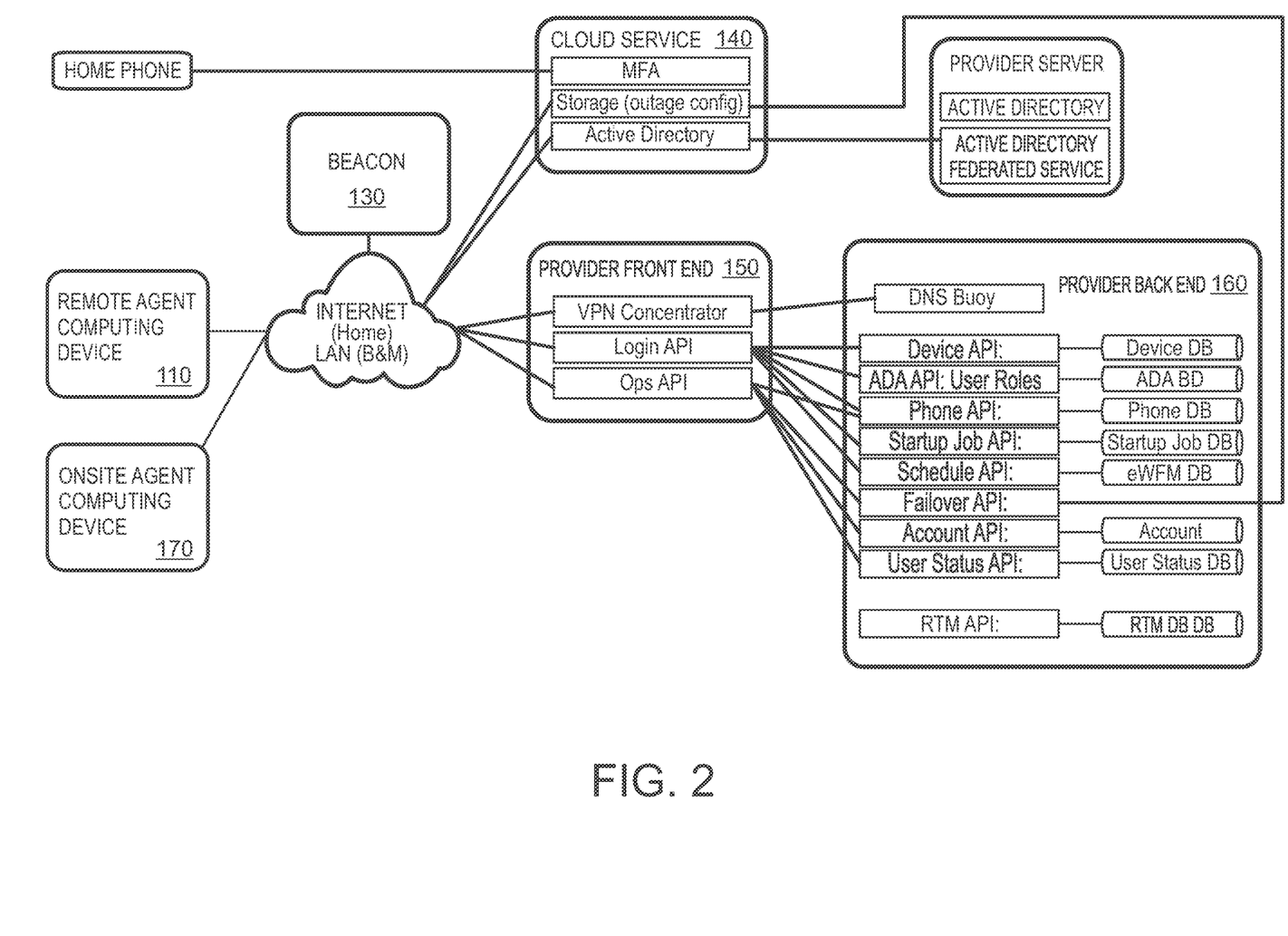
FIG. 2 is an exemplary system diagram according to one embodiment that depicts communication between software components.

The remote agent computing device 110, beacon computing device 130, cloud service computing device 140, provider front end computing device 150, and provider back end computing device 160, and an onsite agent computing device 170 include one or more integrated software applications that provide a graphical user interface, permit communication with other electronic devices, and generally implement the steps of the methods disclosed herein. The computing devices may also utilize software applications that function using resource available through a third-party provider, such as a Software as a Service ("SaasS"), Platform as a Service ("PaaS"), or Infrastructure as a Service ("IaaS") provider running on a third-party cloud service computing device 140. For instance, the cloud computing device 130 may function as a resource provider by providing remote data storage capabilities or running software applications utilized by remote devices. FIG. 2 is a system configuration diagram that illustrates some of the software applications and application programming interfaces ("APIs") that are utilized to implement the present systems and methods.

Exemplary GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

Figure 3:
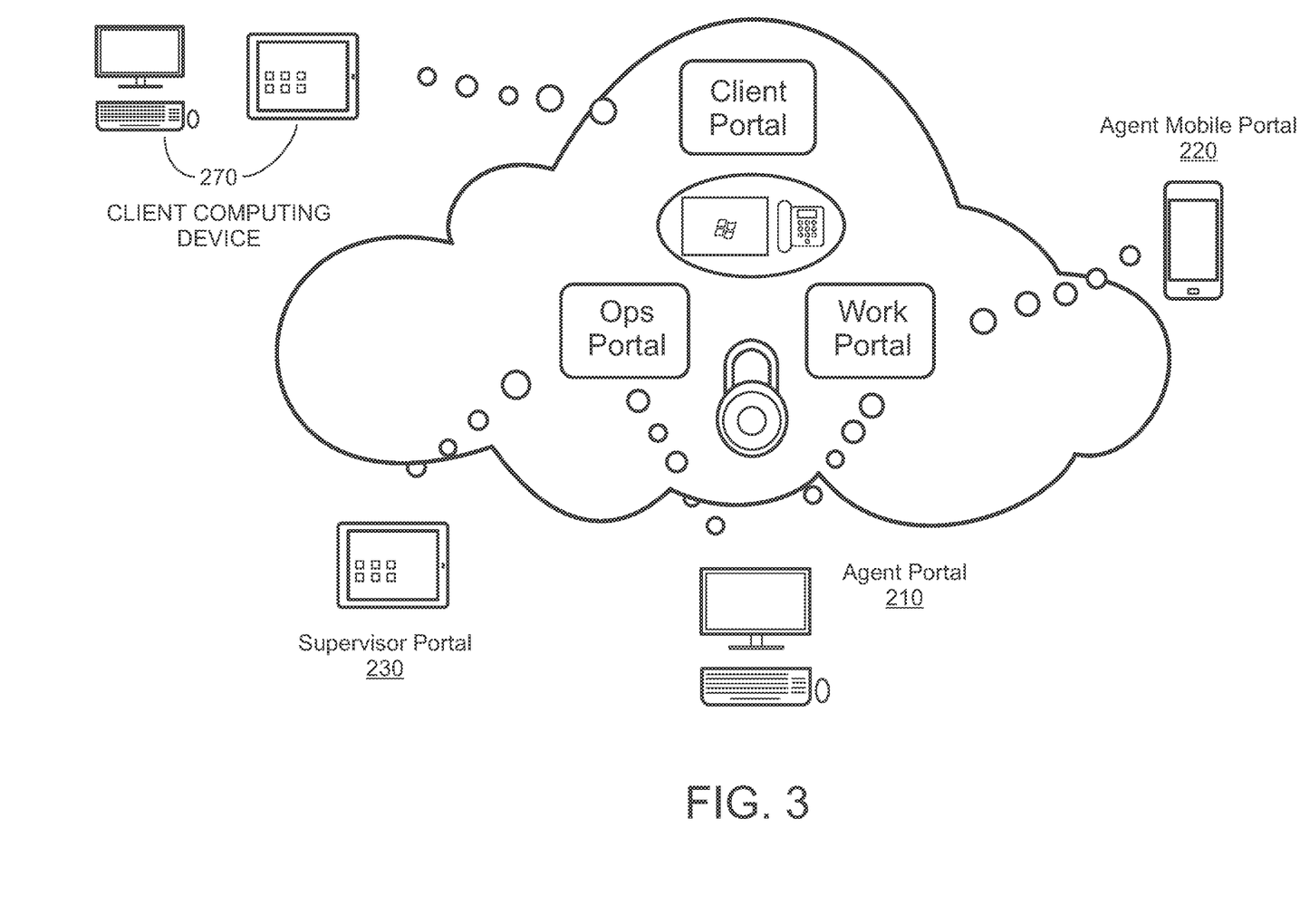
FIG. 3 illustrates exemplary system portals for accessing a provider network.

FIG. 3 is alternate depiction of the system 100 that illustrates exemplary system portals utilized in accessing the provider internal network. The Agent Portal 210 is a secure entry point to the provider network that may be accomplished via an onsite agent computing device 170 or a remote agent computing device 110, such as a thin client. The Agent Portal 210 provides agents with a means to access provider resources through the Operations Portal, such as a virtual desktop interface ("VDI") software application or a virtual telephony interface ("VTI") software application, among others. The Agent Mobile Portal 220 provides agents with access to less sensitive provider resources, such as, but not limited to, agent scheduling, policies, and benefits. The Agent Portal 210 and Agent Mobile Portal 220 connect to the provider internal network through a Work Portal that implements authentication and security functions.

The Supervisor Portal 230 permits team leads and managers to connect to the provider internal network either locally or remotely to access provider resources and data available through the Operations Portal, such as dashboards and agent performance data. The Client Portal enables a provider's customers or clients to securely communicate with the provider internal network to access certain predetermined provider resources and data using a client computing device 270.

Figure 4:
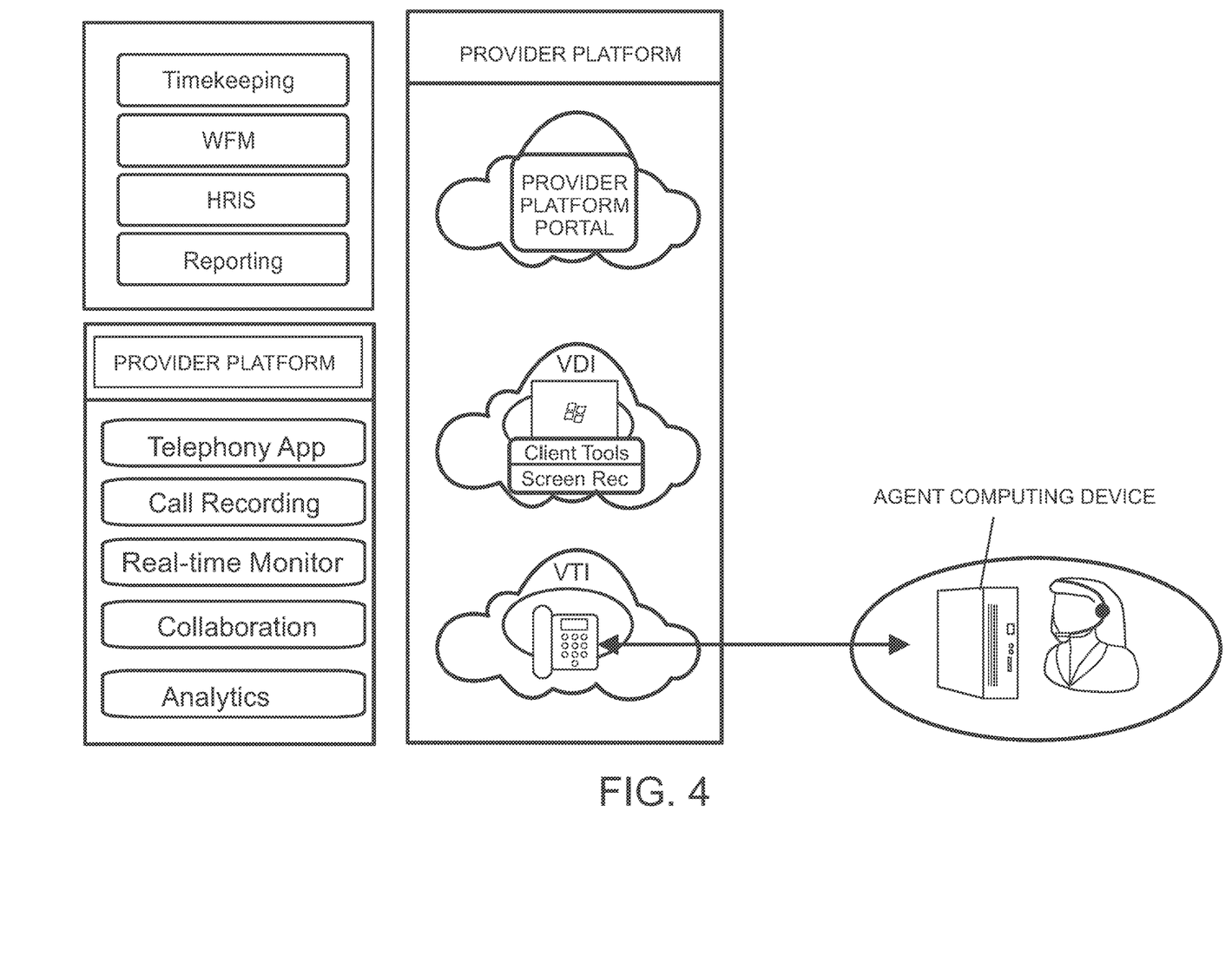
FIG. 4 depicts exemplary components of a provider platform.

FIG. 4 illustrates some features of the Agent Portal 210, including, for example, use of an agent computing device 110 & 170 to access a provider platform portal as well as VDI and VTI software applications. Through the provider platform, the agent computing device also accesses various software applications available through the provider platform, including, but not limited to, timekeeping applications, Work Force Management applications, human resource ("HRIS") applications, reporting applications, call recording applications, a Real-Time Monitoring ("RTM") application, collaboration software applications (e.g., chat or real-time messaging applications), and analytics applications, among others. Access to such applications through the provider network begins with a secure authentication process discussed in more detail below.

The starting point for secure authentication is the seamless login process. The seamless login process finds particular utility in providing critical security features for authenticating remote computing devices and users, and it enables the novel capability for platform users to utilize one set of credentials to function in a multitude of roles with a provider.

Existing systems require complex logins and application navigation into many disparate systems and applications. This is often a complex and cumbersome task that varies depending on the work the agent is going to perform as well as the location where the agent is working. For instance, one set of authentication or login credentials may be required to access a provider network while additional sets of credentials may be required for agents to access various software applications or client systems. Existing systems may also lack security features sufficient to adequately protect sensitive provider and customer data with regard to remote agents who might be working from an unsecure network or who are at risk for having their computing devices stolen or hacked.

The present invention overcomes these disadvantages by permitting users to follow a single, intuitive process to login to work from either a service provider facility (e.g., a brick and mortar or "B&M" facility) or a remote location (e.g., a home office). Only one username and password is required to login from the end point and through the VDI to authenticate both the user and the user's computing device. The system may also utilize any suitable multifactor authentication technique ("MFA") known to those of ordinary skill in the art to authenticate the user identity and/or computing device.

Figure 5:
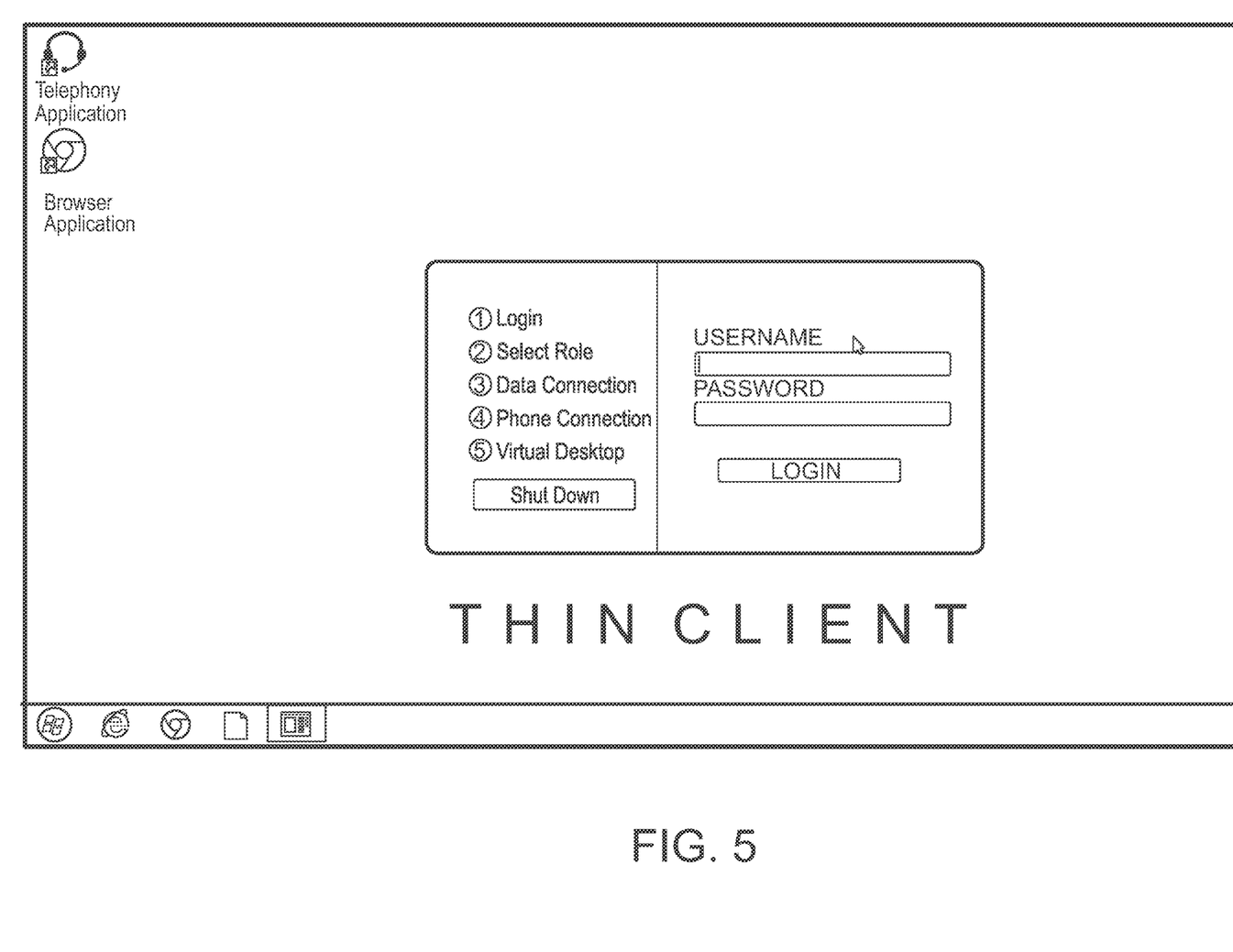
FIG. 5 is an exemplary graphical user interface for entering login credentials.

The seamless login process begins with an agent booting the agent computing device 110 & 170 which can be a thin client device. Upon boot, the agent computing device 110 & 170 initiates a software application that displays the Login GUI shown in FIG. 5. The user enters login credentials, such as a username and password, into the display screen of FIG. 5 and selects the Login function. The software application retrieves an end point configuration ("EPCFG") file saved to the agent computing device. The EPCFG file includes a string of alphabetical or numeric characters that is combined with part or all of the username and translated by a domain name service ("DNS") function to determine an IP address for the beacon computing device 130. The username can be, for instance, a User Principal Name or an email address that contains domain information (e.g., "@domain.com") that is combined with the EPCFG character string.

A local web proxy on the agent computing deice 110 & 170 restricts Internet web access. When the agent computing device is first booted, the web proxy is enabled and no access is allowed to any Universal Resource Locator ("URL"). The Login GUI code progressively adds whitelist entries to allow access to specific URLs on demand, when needed. As an example, IP address for the beacon computing device 130 can be added to the whitelist after it is determined from combining the User Principal Name data and the EPCFG file. As another example, an entire domain can be added to the whitelist to permit broader access to a remote network if it would be necessary to facilitate access to various resources with a particular domain.

The agent computing device 110 & 170 transmits a message to the beacon computing device 130, and the beacon computing device 130 returns standard operations configuration data, including an IP address or URL for the cloud service computing device 140, a failover flag, and whitelist URL entries. Using the standard operations configuration data, the remote agent computing device 110 & 170 transmits a user authentication message that includes the user login credentials to the cloud service computing device 140 that is running an active directory software application. The active directory software application determines whether the user identity has been previously authenticated by checking the user authentication message for an agent token. If the user identity has not been previously authenticated, the active directory software application transmits a message to an active directory federated service ("ADFS") software application running on a provider back end computing device 160. The ADFS application authenticates the login credentials by comparing the received credentials to known values and returns a user authentication status message indicating success or failure to the cloud service computing device 140, which in turn transmits a user authentication message to the agent computing device 110 & 170.

The agent computing device 110 & 170 gathers system configuration data such as: (1) a unique identifier for the agent computing device (e.g., a media access control ("MAC") address hardcoded into the communication subsystem of the remote agent computing device); (2) a MAC address for the local network of a remote agent computing device 110 (e.g., a router MAC address); (3) copies of key system files; (4) a system boot time; (5) a list of applications running on the agent computing device; (6) a list of installed applications; and (7) any other data useful for authenticating the agent computing device 110 & 170. The agent computing device 110 & 170 encrypts the key system files and saves the encrypted key system files with the remaining system configuration data to a temporary login file.

The agent computing device 110 & 170 encrypts the key system files by creating a one-way hash summary of the key system files that allows the provider back end computing device 160 to authenticate the remote agent computing device 110. If the configuration of the platform has changed resulting in a change to the key system files, then authentication of the hashed key system files may fail, and the login can be denied. Hashing techniques apply a hashing algorithm to known data to create a one-way hash value. Any suitable hashing algorithm can be used, including, but not limited to, SHA-1 or SHA-2 algorithms. A one-way hash value is preferably a value of fixed length that is unique to the known data. In other words, if the known data (i.e., data representing the key system file configuration stored to the provider server 160) is changed in any respect, the hash value will also change. The hash value, thus, acts as a fingerprint for the known data. If the operating system software or hardware configuration is altered, then the key system files and resulting one way hash will be changed, and device authentication will fail.

Following successful authentication of the agent identity, the agent computing device 110 & 170 transmits the device configuration data to the provider front end computing device 150. A Login API software application running on the provider front end computing device 150 transmits the device configuration data to the provider back end device 160 for authentication by a Device API software application. The device configuration data is authenticated by comparing the device configuration data received from the agent computing device 110 & 170 with data stored to a Device Database on the provider back end computing device 160. The Device API authenticates the device configuration data and returns a device authentication status message (e.g., a success or failure) to the Login API of the provider front end computing device 150, which in turn transmits the device authentication status message to the agent computing device 110 & 170. In this manner, both the user identity and the agent computing device 110 & 170 are authenticated without direct communication between the agent computing device 110 & 170 and the provider back end computing device 160, thereby ensuring that the provider back computing device 160 remains isolated from communication with untrusted devices or networks.

If the device authentication fails, the Device API may optionally initiate a registration sequence to register the agent computing device 110 & 170. If the authentication is successful, the Device API also verifies that the received device configuration data is associated with the user login credentials. If the device configuration data is not associated with the received credentials, the Device API can optionally initiate a registration sequence.

After authenticating the agent and agent computing device, a multi-factor authentication ("MFA") process running on the cloud service provider computing device 140 initiates a telephone call to a phone number associated with the agent. Upon receiving the call, the agent selects an input function on the telephone to transmit response data to the MFA software process and confirm receipt of the call, thereby further authenticating the agent's identity. The function can be the agent's selection of any key on the telephone or a predetermined sequence of keys, such as a passcode. Skilled artisans will appreciate that other forms of multi-factor authentication are possible. As one example, the MFA process may send a text message containing a passcode to the agent's cellular phone that must be then entered into a user interface running on the remote agent computing device 110.

If the user and device authentication are successful, the Login API transmits a permissions request message containing agent identifying information to an ADA API process running on the provider back end computing device 160 to determine what systems, applications, and resources should be made available to the agent. The ADA API is an identity management service ("IdM") that includes a database ("ADA Database") associating each agent or other user with a predefined set of permissions. In one embodiment, the permissions specify the provider clients, client products and service (i.e., line of business or "LOB"), and job functions or roles that an agent is authorized to access or perform for a particular client. In this manner, the system ensures that agents have limited access to authorized clients and lines of business.

Figure 6:
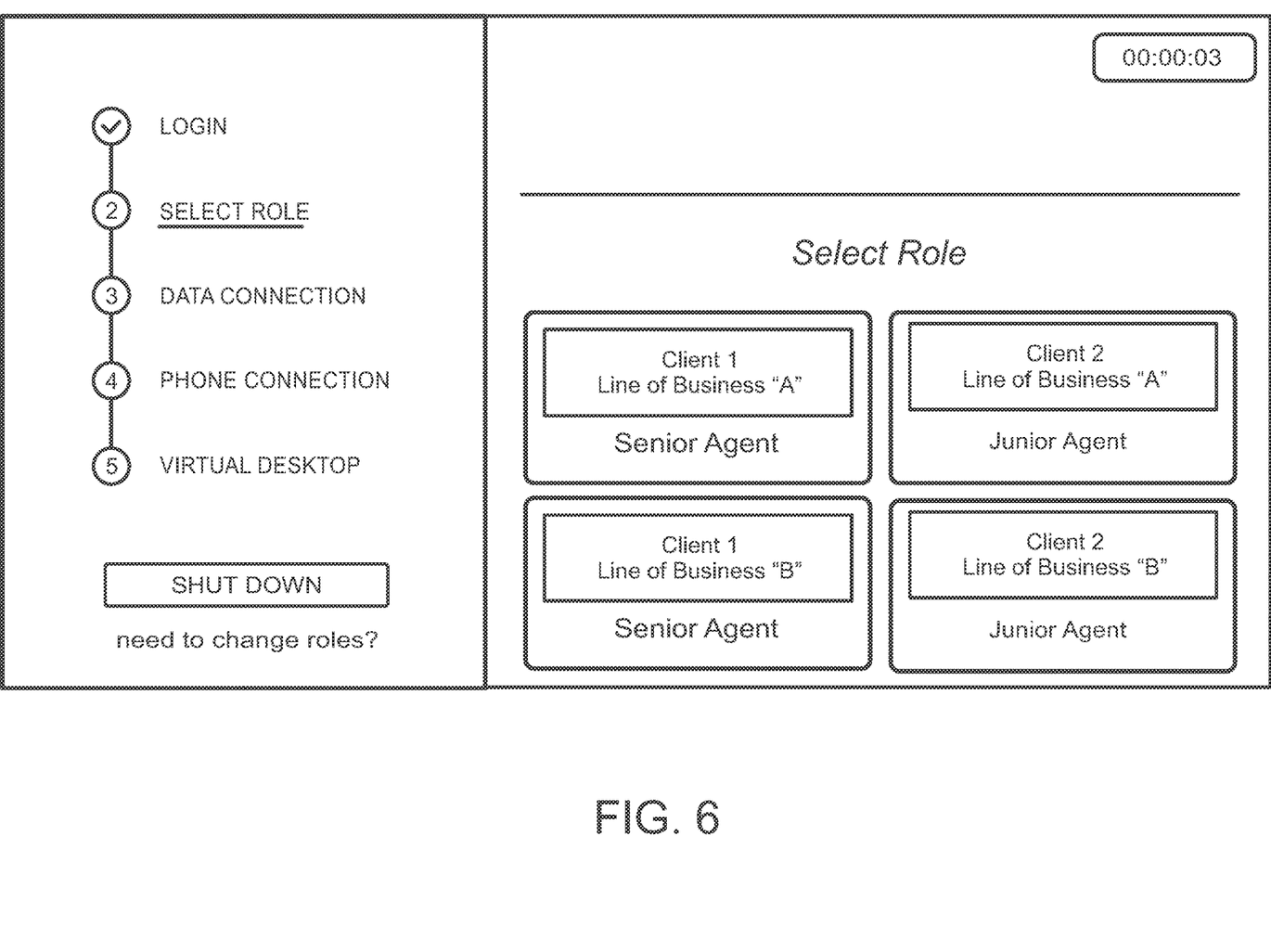
FIG. 6 is an exemplary graphical user interface permitting role selection.

The ADA API accesses the ADA Database and returns a user permissions message containing permissions data to the Login API, and the Login API in turn transmits permissions data to the agent computing device 110 & 170. Based on the permissions data received from the Login API, the agent computing device 110 & 170 displays the exemplary access panel GUI shown in FIG. 6.

Permissions can be illustrated with the following simplified example where the provider might provide customer support services to two clients with client 1 being a photography equipment manufacturer and client 2 being a printer manufacturer. For each client, the provider might provide customer support services for two products (i.e., two different cameras and two different printers). An agent might be trained to provide customer support for all four products but have more experience with client 1's camera products and less experience with client 2's printer products. In that case, the agent can be designated a "Senior Agent" for client 1 and a "Junior Agent" for client 2. Upon reporting for a work shift and successfully authenticating the agent's identity and device, the agent would be presented with the display screen shown in FIG. 6 in which the agent selects one of the Select Role functions to access a virtual desktop environment where the agent may begin working to provide customer support for one of the four products in a given capacity as a Senior Agent or Junior Agent.

The system may perform additional checks, such as a buoy check to determine if the agent computing device 110 & 170 is on the provider network. After receiving a role selection message, the Login API returns a command to the agent computing device 110 & 170 causing the agent computing device to ping a DNS Buoy application running on the provider back end system. If the agent computing device is running on the provider network (i.e., an onsite agent computing device 170), then the agent computing device will receive a ping response that can be reported to the provider computing device. If the agent computing device is not running on the provider back end network (i.e., a remote agent computing device 110), then the agent computing device will not receive a response from the DNS Buoy. Those of skill in the art will appreciate that other means of determining whether an agent computing device is on the network may be used. For example, the Login API may transmit to the DNS Buoy application an IP address for the agent computing device, and the DNS Buoy performs a lookup to determine if the received IP address is presently listed as being connected to a provider local network.

By determining whether the agent computing device 110 & 170 is operating remotely or locally to a provider network, the provider back end system can perform certain authentication steps or provide appropriate configuration information, such as a particular virtual private network ("VPN") universal resource locator ("URL"), to the agent computing device 110 & 170. The VPN URL is added to the agent computing device 110 & 170 whitelist so that the web proxy running on the device enables communication between the agent computing device and the remote VPN end point. In some embodiments, certain domains may be added to the whitelist depending on the permissions selection if, for instance, an agent computing device would need access to certain remote network resource of the client while performing a given role.

In one embodiment, a VPN Concentrator application running on the provider front end computing device 150 will initiate a multi-factor authentication procedure through the cloud service computing device 140 if it is determined that the agent computing device is operating remotely but not if the agent computing device is running on the provider local network.

The provider back end computing device 160 communicates with the Login API of the provider front end computing device 150 to transmit URL data for a VPN connection and for an OPS API running on the provider front end computing device 150. The URL data is transmitted by the Login API to the agent computing device 110 & 170 and used to establish a VPN connection between the agent computing device 110 & 170 and the provider front end computing device 150 and to establish communication with the Ops API.

The system may also initiate a Schedule Based Access ("SBA") check to determine if the agent is scheduled to work at the time of the login for the selected client, line of business, and role. The Login API transmits to the provider back end computing device 160 Schedule API data concerning the agent identity, the agent computing device, and the requested permissions (i.e., the selected client, line of business, and role). The Schedule API verifies the permissions data by comparing the received permissions data against data stored to an electronic Work Flow Management ("eWFM") database associated with the provider back end computing device 160. The Schedule API returns a permissions verification status message (i.e., pass or fail) to the Login API, and the Login API transmits the permissions verification status message to the agent computing device 110 & 170. The Login API or the Ops API may transmit the station assignment/selected permissions and agent identity information to the Failover API on the back end computing device 160 for transmission and storage to the cloud service computing device 140 for use in the event of a system outage.

The Ops API requests startup job information from the Startup Job API running on the back end computing device 160. The Startup Jobs API returns commands that can also include job configuration data that is transmitted to the Login API and then to the agent computing device 110 & 170. The startup job configuration data can be a file containing data used to connect to particular servers for initiating a VDI or VTI software application displayed on the agent computing device 110 & 170. The Startup Job API also returns commands for execution by the thin client, such as instructions to download or run particular software applications used to establish a VDI or VTI connection or in performing an agent's job.

The agent computing device 110 & 170 web proxy can utilize the startup job configuration data to add the appropriate URLs to the whitelist to enable communication between the agent computing device and the remote machine hosting the VDI or VTI environment. The VDI application provides a customizable virtual desktop environment with pre-installed software applications used by an agent to provide services to a given client, for a given line of business, and in a particular role. Similarly, the VTI application provides a customizable virtual phone that an agent can use to make or receive voice calls from customers, other agents, etc.

The agent computing device 110 & 170 initiates the VDI and VTI software application by communicating with the Ops API running on the provider front end computing device 150, which in turn communicates with one or more APIs running on the provider back end computing device 160. On initiating the VDI and VTI software applications, the provider front end computing device Ops API may transmit settings data to the agent computing device 110 & 170 used by the VDI and VTI software applications. For instance, the settings data may include a VTI configuration file in extensible markup language ("XML") format that contains information such as the agent's phone number or extension, any preconfigured "speed dial" buttons used on the agents virtual telephone interface, or the IP address of particular servers that the VTI application communicates with during operation. The configuration files are saved to the volatile memory of the agent computing device 110 & 170 to maintain the security of these devices and avoid associating the agent computing devices 110 & 170 with the provider.

The system is optionally configured with a Failover Service that permits user authentication in the event of a system outage. Following a successful user and device authentication, the Ops API or Login API may communicate with a Failover API running on the provider back end computing device 160 to transmit last known good configuration data (i.e., failover data). The Failover API in turn transmits the failover data to the cloud service computing device 140 so that the failover data is accessible in the event of a system failure. The failover data can include, for instance: (1) the last three versions of the key system files that are part of the system configuration data; (2) permissions data utilized during the immediate prior successful authentication—i.e., the agents last role, line of business and product; (3) operational settings and configuration data, such as a startup jobs, VDI XML file, a VTI XML file, or VPN URLs.

If the provider network experiences a system outage, then a failover flag in the beacon computing device 130 is set to "true," and the flag is transmitted to the agent 110 & 170 computing device following an attempted login. On receipt of the failover flag with a value of true, the agent computing device 110 & 170 transmits to a failover service application a user authentication message with the agent's authentication data (i.e., username and password) as well as the system configuration data. The failover service application, which may be running on the cloud service computing device 140, verifies the authentication data and compares the system configuration data received from the agent computing device 110 & 170 against the last known good configuration data. In this manner, both the agent's identity and the agent's computing device can be authenticated without communication with the provider back end 160 computing device.

If the authentication is successful, failover service application transmits and outage authentication status message to the agent computing device that contains operations settings and configuration data as well as last known permissions data, a VPN URL, VDI and VTI settings data, and startup jobs data. On receipt of the outage authentication status message, the agent computing device 110 & 170 optionally launches an Internet browser software application to display an outage webpage informing the agent of the system outage, providing a URL link to launch the VDI and/or VTI environments, and providing any other relevant information, such as the permissions for with the agent is authorized, an estimated system outage time, etc. Selection of the URL by the agent computing device will then initiate a VDI and VTI environment that corresponds to the permissions for the agent's last successful login.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer-implemented method for authentication and virtual environment setup comprising the steps of:
   (a) generating, by an agent computing device, a first IP address by performing the operations of (i) retrieving domain data input by a user to the agent computing device, (ii) retrieving EPCFG data stored to the agent computing device, (iii) combining the stored EPCFG data with the domain data, and (iv) translating the combined data into the first IP address;
   (b) updating, by the agent computing device, a web proxy file with a whitelist entry to permit communication with at least one specified remote devices;
   (c) transmitting, by the agent computing device, login credentials to a directory service application using the first IP address, and authenticating the login credentials by the directory service application;
   (d) transmitting, by the agent computing device, system configuration data to a provider computing device, and authenticating the system configuration data, wherein the system configuration data comprises (i) encrypted system files, and (ii) a hardware identifier for the agent computing device;
   (e) receiving, by the agent computing device, permissions data transmitted by the provider computing device, and displaying the permissions data on a graphical user interface;
   (f) receiving, by the agent computing device, a permissions data selection and transmitting the permissions data selection to the provider computing device; and
   (g) receiving, by the agent computing device, virtual environment data transmitted by the provider computing device based on the permissions data selection.

2. The method of claim 1, wherein the virtual environment data comprises virtual desktop image data.

3. The method of claim 2, wherein the agent computing device is a thin client computing device.

4. The method of claim 3, wherein the system configuration data further comprises a system boot time, a list of installed software applications, a local network MAC address, and a list of applications running on the agent computing device.

5. The method of claim 1, wherein the directory service application is running on a cloud computing device.

6. The method of claim 5, wherein the agent computing device obtains address data for the cloud computing device through the operations of:
   (a) transmitting, by the agent computing device, an operations configuration data request message to a beacon computing device, wherein the beacon computing device has a beacon IP address equal to the first IP address; and
   (b) receiving, by the agent computing device, operational configuration data transmitted by the beacon computing device, wherein the operational configuration data comprises a cloud computing device IP address.

7. The method of claim 6, wherein following transmission of the permissions data selection to the provider computing device and prior to receipt of the virtual environment data by the agent computing device, the method further comprises the steps of:
   (a) performing, by the provider computing device, a buoy check;
   (b) determining, by the provider computing device, connection settings data based on the buoy check and the permissions data selection, wherein the connection settings data includes a VPN URL;
   (c) performing, by the provider computing device, a schedule based access check using the permissions data selection;
   (d) transmitting, by the provider computing device, the connection settings data to the agent computing device, wherein the connections settings data is used to establish a VPN connection between the agent computing device and the provider computing device;

(e) transmitting, by the provider computing device, virtual environment settings data to the agent computing device;

(f) initiating, by the agent computing device, one or more virtual environment applications that displays the virtual environment data received from the provider computing device using the virtual environment settings data.

8. The method of claim 7, wherein the one or more virtual environment applications comprises a virtual desktop application and a virtual telephone application.

9. The method of claim 8 further comprising the steps of:

(a) storing, by the cloud computing device, failover data transmitted by a failover application, wherein the failover data comprises (i) the system configuration data, (ii) the permissions data selection, and (iii) the virtual environment settings data;

(b) detecting, by the agent computing device, a network outage condition, wherein when an outage condition is detected,
  (i) the agent computing device is configured to transmit authentication data comprising login credentials and current system configuration data to the failover application,
  (ii) the failover application is configured to retrieve the stored failover data from the cloud computing device, compare the stored failover data to the received authentication data, and validate the authenticate data based on the comparison, and
  (iii) the failover service application is further configured to transmit the VPN URL and virtual environment data settings to the agent computing device.

10. A computer-implemented method for authentication and virtual environment setup comprising the steps of:

(a) receiving, by a directory service application that is running on a cloud computing device, login credentials transmitted by an agent computing device, wherein the agent computing device is a thin client computing device;

(b) authenticating, by the directory service application, the login credentials;

(c) receiving, by a provider computing device, system configuration data transmitted by an agent computing device, wherein the system configuration data comprises (i) encrypted system files, and (ii) a hardware identifier for the agent computing device;

(d) authenticating, by the provider computing device, the system configuration data;

(e) obtaining, by the provider computing device, permissions data from an ADA database;

(f) transmitting, by the provider computing device, the permissions data to the agent computing device;

(g) receiving, by the provider computing device, a permissions data selection transmitted by an agent computing device;

(h) performing, by the provider computing device, a buoy check;

(i) determining, by the provider computing device, connection settings data based on the buoy check and the permissions data selection, wherein the connection settings data includes a VPN URL;

(j) performing, by the provider computing device, a schedule based access check using the permissions data selection;

(k) transmitting, by the provider computing device, the connection settings data to the agent computing device, wherein the connections settings data is used to establish a VPN connection between the agent computing device and the provider computing device;

(l) transmitting, by the provider computing device, virtual environment settings data to the agent computing device;

(m) initiating, by the agent computing device, one or more virtual environment applications that displays the virtual environment data from received the provider computing device using the virtual environment settings data; and (n) transmitting, by the provider computing device, virtual environment data to the agent computing device, wherein the virtual environment data comprises virtual desktop image data.

11. The method of claim 10 further comprising the steps of:

(a) storing, by the cloud computing device, failover data transmitted by a failover application, wherein the failover data comprises (i) the system configuration data, (ii) the permissions data selection, and (iii) the virtual environment settings data;

(b) detecting, by the agent computing device, a network outage condition, wherein when an outage condition is detected,
  (i) the agent computing device is configured to transmit authentication data comprising login credentials and current system configuration data to the failover application,
  (ii) the failover application is configured to retrieve the stored failover data from the cloud computing device, compare the stored failover data to the received authentication data, and validate the authenticate data based on the comparison, and
  (iii) the failover service application is further configured to transmit the VPN URL and virtual environment data settings to the agent computing device.

12. A system for secure authentication and virtual environment setup comprising:

an agent processor, the agent processor coupled to a first data storage device including non-transitory computer-readable medium with computer-readable code for instructing the agent processor;

a beacon processor, the beacon processor coupled to a second data storage device including non-transitory computer-readable medium with computer-readable code for instructing the beacon processor;

a cloud processor, the cloud processor coupled to a third data storage device including non-transitory computer-readable medium with computer-readable code for instructing the cloud processor;

a front end device processor, the front end device processor coupled to a fourth data storage device including non-transitory computer-readable medium with computer-readable code for instructing the front end processor; and a back end processor associated with a cloud server computing device, the back end device processor coupled to a fifth data storage device including non-transitory computer-readable medium with computer-readable code for instructing the back end processor;

wherein when the computer-readable code is executed by the processors, the processors perform operations comprising:

(a) generating, by an agent computing device, a beacon IP address by performing the operations of (i) retrieving domain data input by a user, (ii) retrieving EPCFG data stored to the first data storage device, (iii) combining the stored EPCFG data with the domain data, and (iv) translating the combined data into the beacon IP address;

(b) transmitting, by the agent processor, an operational configuration data request message to the beacon processor using the beacon IP address;

(c) receiving, by the agent processor, operational configuration data transmitted by the beacon processor, wherein the operational configuration data includes a cloud IP address;

(d) transmitting, by the agent processor, login credentials to the cloud processor using the cloud IP address, and authenticating the login credentials by a directory service application;

(e) transmitting, by the agent processor, system configuration data to the front end processor, wherein the system configuration data comprises encrypted system files and a hardware identifier for the agent computing device, and authenticating the system configuration data through a call to a Device API running on the back end processor;

(f) transmitting, by the front end processor, permissions data to the agent processor, wherein the permissions data is obtained through a call to an ADA API running on the back end processor, and (g) receiving, by the agent processor, permissions data transmitted by the front end processor, and displaying the permissions data on a graphical user interface;

(h) receiving, by the agent processor, a permissions data selection and transmitting the permissions data selection to the front end processor; and (i) receiving, by the agent processor, virtual environment data transmitted by the front end processor based on the permissions data selection.

13. The system of claim 12, wherein following transmission of the permissions data selection to the front end processor device and prior to receipt of the virtual environment data by the agent processor, the processors are further configured to perform the operations comprising:

(a) performing, by the back end processor, a buoy check;

(b) determining, by the front end processor, connection settings data based on the buoy check and the permissions data selection, wherein the connection settings data includes a VPN URL;

(c) performing, by the back end processor, a schedule based access check using the permissions data selection;

(d) transmitting, by the front end processor, the connection settings data to the agent processor, wherein the connections settings data is used to establish a VPN connection between the agent processor and the front end processor;

(e) transmitting, by the front end processor, virtual environment settings data to the agent processor;

(f) initiating, by the agent processor, one or more virtual environment applications that displays the virtual environment data from received the front end processor using the virtual environment settings data.

14. The system of claim 13, wherein the one or more virtual environment applications comprises a virtual desktop application and a virtual telephone application.

* * * * *